United States Patent [19]

Dewhurst et al.

[11] Patent Number: 5,227,450
[45] Date of Patent: Jul. 13, 1993

[54] HYDROXYL-CONTAINING ORGANOTIN CATALYSTS FOR MAKING POLYURETHANE RIM ELASTOMERS

[75] Inventors: John E. Dewhurst, Macungie; James D. Nichols, Fogelsville, both of Pa.

[73] Assignee: Air Products and Chemicals, Inc., Allentown, Pa.

[21] Appl. No.: 903,433

[22] Filed: Jun. 24, 1992

Related U.S. Application Data

[63] Continuation-in-part of Ser. No. 626,357, Dec. 12, 1990, abandoned.

[51] Int. Cl.$^5$ .............................................. C08G 18/24
[52] U.S. Cl. ...................................... 528/58; 521/126; 521/129; 521/155; 521/163; 521/174; 524/181; 528/65; 528/66; 528/76
[58] Field of Search ..................... 528/58, 65, 66, 76, 528/59, 49; 521/126, 129, 155, 163, 174; 524/181

[56] References Cited

U.S. PATENT DOCUMENTS

| | | | |
|---|---|---|---|
| 4,433,067 | 2/1984 | Rice et al. | 521/51 |
| 4,444,910 | 4/1984 | Rice et al. | 521/51 |
| 4,792,576 | 12/1988 | Nodelman | 521/174 |
| 4,906,674 | 8/1990 | Cassidy et al. | 521/159 |
| 4,952,660 | 8/1990 | Sioun Lin et al. | 528/49 |
| 5,011,647 | 4/1991 | Meyer et al. | 264/300 |

Primary Examiner—John Kight, III
Assistant Examiner—John M. Cooney, Jr.
Attorney, Agent, or Firm—Michael Leach; James C. Simmons; William F. Marsh

[57] ABSTRACT

The invention relates to reaction injection molded elastomers derived from high molecular weight polyether polyols, an aromatic diamine chain extender, a polyisocyanate and a hydroxyl-containing organotin catalyst. The reaction injection molded (RIM) elastomers of this invention are useful, for example, as automobile body parts.

20 Claims, No Drawings

HYDROXYL-CONTAINING ORGANOTIN CATALYSTS FOR MAKING POLYURETHANE RIM ELASTOMERS

CROSS-REFERENCE TO RELATED APPLICATIONS

This application is a continuation-in-part of application Ser. No. 07/626,357 filed Dec. 12, 1990, now abandoned.

TECHNICAL FIELD

The present invention relates to reaction injection molded (RIM) elastomers.

BACKGROUND OF THE INVENTION

Polyurethane and polyurethaneurea RIM elastomers require the use of tin catalysts for acceptable processing. In a system based on high molecular weight polyether polyols and aromatic diamine chain extenders, it is customary to use dibutyltin dilaurate to catalyze the hydroxyl-isocyanate (OH—NCO) reaction. Without this catalyst additive it is impossible to make a RIM part with sufficient green strength to be demolded. Yet, it is well known that the presence of tin catalyst in the final elastomer limits the thermal stability of the material since it can catalyze the unzipping of urethane bonds. The need for high thermal stability in RIM elastomers is the result of high paint baking temperatures. Physical distortion, cracking, oiling and blistering can be observed if tin catalyst is present to promote the chemical breakdown of urethane linkages.

One solution to this problem has been the use of polyurea RIM based on isocyanate-reactive components which do not contain OH group, e.g., aliphatic amine terminated polyethers as disclosed in U.S. Pat. No. 4,433,067. Since the reaction of the amino (—NH$_2$) groups with NCO groups is so rapid, no tin catalyst is needed although there is still some benefit to their use in polyurea RIM elastomers as disclosed in U.S. Pat. No. 4,444,910. However, the drawback to this solution is the high reactivity of the aliphatic amine terminated polyethers which makes is difficult to achieve high modulus elastomers with good flowability. Additionally, these products are more expensive than conventional RIM polyols and are not available in "filled" versions such as polymer polyols, grafted polyols or PHD polyols.

SUMMARY OF THE INVENTION

The present invention is a reaction injected molded (RIM) elastomer comprising the cured reaction product of a polyether polyol of greater than 500 molecular weight, an aromatic diamine chain extender and an aromatic polyisocyanate in the presence of a hydroxyl-containing diorganotin catalyst. The invention is also a method for preparing a RIM polyurethane elastomer.

The use of a hydroxyl-containing diorganotin catalyst provides for improved thermal stability of conventional polyether polyol polyurethane and polyurethaneurea RIM systems. In addition, unfilled or filled polyols can be used and high modulus elastomers with improved flowability over polyurea RIM systems are obtained.

Another embodiment of the invention is a hydroxyl-containing diorganotin catalyst of the following formula $$R_2Sn[O_2C(Y)_nCO_2-Z-OH]_2$$

where
R is a $C_1$–$C_8$ alkyl group or an aryl group;
Y is a $C_1$–$C_9$ divalent hydrocarbyl group;
Z is a divalent organic linking group; and
n is 0 or 1.

DETAILED DESCRIPTION OF THE INVENTION

The RIM elastomer of the invention may be prepared from as few as four ingredients, namely a high molecular weight polyether polyol, an aromatic diamine chain extender, an aromatic polyisocyanate and a hydroxyl-containing diorganotin catalyst.

The polyether polyols useful in the invention include primary and secondary hydroxyl-terminated polyether polyols of greater than 500 average molecular weight having from 2 to 6 functionality, preferably from 2 to 3, and a hydroxyl equivalent weight of from 250 to about 2500. Mixtures of polyether polyols may be used. In a preferred embodiment the polyether polyols have an average molecular weight of at least 6000.

The polyether polyols useful in the invention are polyether polyols made from an appropriate initiator to which lower alkylene oxides such as ethylene oxide, propylene oxide, butylene oxide or mixtures thereof are added resulting in hydroxyl-terminated polyols. When two or more oxides are used, they may be present as random mixtures or as blocks of one or the other polyether. Thus the polyalkylene ether polyols include the poly(alkylene oxide) polymers, such as poly(ethylene oxide) and poly(propylene oxide) polymers and copolymers, with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol glycerol, diglycerol, trimethylol propane and like low molecular weight polyols.

In the practice of this invention, a single high molecular weight polyether polyol may be used. Also, mixtures of high molecular weight polyether polyols such as mixtures of di- and tri-functional materials and/or different molecular weight or different chemical composition materials may be used.

The aromatic diamine chain extenders useful in this invention include, for example, 1-methyl-3,5-diethyl-2,4-diaminobenzene; 1-methyl-3,5-diethyl-2,6-diaminobenzene (both of these materials are also called diethyltoluenediamine or DETDA); 1,3,5-triethyl-2,6-diaminobenzene; 2,4-dimethyl-6-t-butyl-3,5-diaminobenzene; 3,5,3',5'-tetraethyl-4,4'-diaminodiphenylmethane; 1-methyl-3-t-butyl-2,4-diaminobenzene; 1-methyl-5-t-butyl-2,6-diaminobenzene (both these materials are also called t-butyltoluenediamine or TBTDA) and the like. Particularly preferred aromatic diamine chain extenders are DETDA and TBTDA. It is within the scope of the invention to include some aliphatic chain extender materials as described in U.S. Pat. Nos. 4,246,363 and 4,269,945.

A wide variety of aromatic polyisocyanates may be used. Typical aromatic polyisocyanates include phenylenediisocyanate, toluenediisocyanate and 4,4'-diphenylmethanediisocyanate. Especially suitable are the 2,4- and 2,6-toluenediisocyanates individually or together as their commercially available mixtures. Other especially suitable mixtures of diisocyanates are those known commercially as "crude MDI" also known as PAPI, which contain about 60% of 4,4'-diphenylmethanediisocyanate along with other isomeric and analogous higher polyiisocyanates. Also suitable are "prepolymers" of these polyisocyanates comprising a partially pre-reacted mixture of polyisocyanates and polyether polyols.

The hydroxyl-containing diorganotin compound may suitably be an organotin compound of the following general formula I:

$$R_2Sn\{O_2C(Y)_nCO_2-Z-OH\}_2 \qquad I$$

where

R is a $C_1$–$C_8$ alkyl group, preferably n-butyl or octyl, or an aryl group, preferably phenyl;

Y is a $C_1$–$C_9$ divalent hydrocarbyl group, for example, alkylene, alkenylene, arylene and alkarylene, preferably methylene, ethylene, propylene, butylene, cis or trans ethenylene, and 1,2-; 1,3-; or 1,4- phenylene [—$C_6H_4$—];

Z is a divalent organic linking group; and n is 0 or 1.

Although Z can be any divalent organic linking group including Y, it is preferred that the linking group Z be a divalent mono- or poly(alkyleneoxy) group such as —[$OCH_2CH_2$]$_m$— or —[$OCH(CH_3)CH_2$]$_m$—, where m is 1–5; or a divalent di[mono- or poly(alkyleneoxy)-]alkylamine, where the alkyl group contains from 1 to 22 carbon atoms and preferably is a fatty group and the mono- or poly(alkyleneoxy) group is —[$OCH_2CH_2$]$_m$— or —[$OCH(CH_3)CH_2$]$_m$— and m is 1–5. It should be understood that the oxygen atom in the hydroxyl group of general formula I is the terminal oxygen of the above-mentioned mono- and poly(alkyleneoxy) groups.

A general procedure for preparing the diorganotin catalysts of the above general formula would involve charging a mixture of the appropriate dicarboxylic acid [$HO_2C(Y)_nCO_2H$] and the appropriate dihydroxyl containing organic linking compound (HO—Z—OH) to a reaction vessel in equimolar quantities and heating under an inert atmosphere to form the monoester followed by reaction with diorganotin oxide ($R_2SnO$) in a solvent such as toluene by heating to reflux temperature until the water of reaction has been removed by distillation. The organic solvent can then be evaporated to afford essentially quantitative product yields of the diorganotin catalyst.

Suitable dicarboxylic acids include oxalic acid, malonic acid, succinic acid, glutaric acid, adipic acid, pimelic acid, suberic acid, azelaic acid, sebacic acid, maleic acid, fumaric acid, and phthalic, isophthalic and terephthalic acids. Suitable dihydroxyl containing organic linking compounds include ethylene glycol, propylene glycol, polyethylene glycols, polypropylene glycols, di(hydroxyethyl)alkylamine, di(2-hydroxypropyl)alkylamine, di(polyethoxylated)alkylamine and di(polypropoxylated)alkylamine.

A catalytically effective amount of the diorganotin catalyst is used in the RIM elastomer formulation comprising polyisocyanate, aromatic diamine and polyether polyol. Specifically, suitable amounts of the catalyst may range from about 0.025 to 0.3 parts, preferably 0.05 to 0.2 parts, per 100 parts by weight polyether polyol in the RIM elastomer formulation.

Other conventional RIM formulation ingredients may be employed as needed, such as, for example, foam stabilizers, also known as silicone oils or emulsifiers. The foam stabilizer may be an organic silane or siloxane.

Reinforcing materials, if desired, used in the practice of the invention are known to those skilled in the art. For example, chopped or milled glass fibers, chopped or milled carbon fibers and/or other mineral fibers are useful.

Postcuring of the elastomer of the invention is optional and its employment depends on the desired properties of the end product. Postcuring will improve some properties such as heat sag.

EXAMPLE 1

Dibutyltin-bis[mono(triethyleneglycol) succinate]

A mixture of dibutyltin oxide, 24.9 g (0.10 mole), mono(triethyleneglycol) succinate, 50 g (0.20 mole), and toluene (250 ml) were charged to a round bottom glass reaction flask fitted with a mechanical stirrer, thermocouple and a reflux condenser with a Dean-Stark water trap. The mixture was heated to reflux temperature, with agitation, and continued at reflux until a clear homogeneous solution formed and all water of reaction was collected in the trap. Removal of the toluene (flash evaporator) yielded 73 g of liquid product containing 80% of dibutyltin-bis[mono(triethyleneglycol) succinate].

In the following examples, the RIM elastomer runs were conducted using the following materials:

Multranol M 3901—a glycerine-initiated polyoxyalkylene polyether triol having a hydroxyl number of 28 from Mobay Corp.

L-5304—a commercial silicone surfactant from Union Carbide.

DC-198—a commercial silicone surfactant from Air Products and Chemicals, Inc.

Mondur PF—4,4'-diphenyldiisocyanate, which has been liquified by reaction with a low molecular weight glycol to an NCO content of about 22.6% from Mobay Corp.

Dabco 33LV—a 33% solution of triethylenediamine in a glycol carrier from Air Products and Chemicals, Inc.

DETDA—an 80/20 mixture of 3,5-diethyl-2,4-toluenediamine and 3,5-diethyl-2,6-toluenediamine from Ethyl Corp.

t-BTDA—an 80/20 mixture of 5-t-butyl-2,4-toluenediamine and 3-t-butyl-2,6-toluenediamine from Air Products and Chemicals, Inc.

T-12—dibutyltin dilaurate from Air Products and Chemicals, Inc.

T-120—dibutyltin-bis(laurylmercaptide) from Air Products and Chemicals, Inc.

UL-28—dimethyltin dilaurate from Witco Chemical Corp.

Reaction injection molding elastomers were prepared using a model SA8-20 laboratory machine (LIM Kuntstoff Technologie GmbH, Kittsee, Austria) suitable for processing 2-component mixtures. 10–30 cc/min metering pumps for component "A" (modified methylenediphenyldiisocyanate, MDI) and "B" (polyether polyol plus chain extender, silicone and catalyst) were driven synchronously by sprocket wheels in proportion to the mixture to be processed by means of a variable speed (50–250 rpm) motor. Any desired mixing ratio may be established by changing gears. Components A and B were conveyed into a mixing chamber by individually controlled compressed air actuated valves.

A high-speed rotor, continuously adjustable from 10,000 to 18,000 rpm using a frequency transformer, mixed the components.

EXAMPLE 2

For Runs A-C flat placque parts (200×200×2 mm with an average weight of 100 g) were made according to the formulations in Table 1 and were postcured at 120° C. for 1 hour. In each system, the tin metal content was held constant. Thermal stability was determined by annealing the parts for 80 minutes at 165° C., followed by visual and tactile inspection. Both Runs A and B made with non-isocyanate-reactive catalysts (T-12 and T-120) crumbled into pieces as a result of this thermal abuse.

TABLE 1

| Run | A | B | C |
| --- | --- | --- | --- |
| M-3901 | 100 | 100 | 100 |
| t-BTDA | 26 | 26 | 26 |
| L-5304 | 0.8 | 0.8 | 0.8 |
| Dabco-33LV | 0.126 | 0.126 | 0.126 |
| Tin Catalyst | | | |
| Type | T-12 | T-120 | Ex 1 |
| Level | 0.126 | 0.13 | 0.14 |
| Mondur PF | 66.7 | 66.7 | 66.7 |
| Condition After Annealing | Crumbly | Crumbly | Brittle |

EXAMPLE 3

Dibutyltin bis{2-[N-tallow-N-(2-hydroxyethyl)]aminoethylsuccinate}

A mixture of 91.5 g (0.25 moles) bis(2-hydroxyethyl)tallowamine (Ethomeen T/12, AKZO Chemicals, Inc.) and 25 g (0.25 moles) succinic anhydride was charged to a 3-neck round bottom flask (fitted with a stirrer, thermocouple, and condenser with a Dean-Stark water trap) and heated with stirring at 110° C. under a nitrogen blanket for 3 hr. Dibutyltin oxide, 31.2 g (0.125 mole) and 250 ml toluene were added to the flask and the resultant mixture was dehydrated by heating at reflux for 1.5 hr. Removal of the toluene by vacuum distillation (flash evaporator) yielded 141 g (97%) of the desired product, a viscous brown liquid.

EXAMPLE 4

Dibutylin bis{3-[N-(2-hydroxypropyl)-N-tallow]amino-2-propylsuccinate}

Following the procedure of Example 3, 98.25 g (0.25 mole) bis(2-hydroxypropyl)tallowamine (Propomeen T/12, AKZO Chemicals, Inc.) was reacted with 25 g (0.25 mole) succinic anhydride followed by reaction with 31.2 g (0.125 mole) dibutyltin oxide in 250 ml toluene. Removal of the toluene yielded 150 g (98%) of the desired product, a dark brown viscous liquid.

EXAMPLE 5

Dibutyltin bis{2-[N,N(polyethoxy)-N-tallow]succinate}

Following the procedure of Example 3, 124.25 g (0.25mole) di[polyethoxylated(5)] tallowamine (Ethomeen T/15, AKZO Chemicals, Inc.) was reacted with 25 g (0.25 mole) succinic anhydride followed by reaction with 31.2 g (0.125 mole) dibutyltin oxide in 250 ml toluene. Removal of the toluene yielded 175 g (98%) of the desired product, a dark brown viscous liquid.

EXAMPLE 6

For Runs D-I flat placque parts (200×200×2 mm, with an average weight of 100 grams) were made according to the formulations in Table 2 were postcured at 121° C. for one hour. In each system the tin metal content was held constant. Thermal stability was judged by the high temperature heat sags. Lower sags indicate increased thermal stability. Those Runs made with isocyanate-reactive catalysts showed lower heat sags than conventionally used T-12, even when used at higher levels.

TABLE 2

| Run | D | E | F | G | H | I |
| --- | --- | --- | --- | --- | --- | --- |
| M-3901 | 100 | 100 | 100 | 100 | 100 | 100 |
| DETDA | 30.2 | 30.2 | 30.2 | 30.2 | 30.2 | 30.2 |
| DC 198 | .92 | .92 | .92 | .92 | .92 | .92 |
| DABCO 33LV | .13 | .13 | .13 | .13 | .13 | .13 |
| Tin Catalyst | | | | | | |
| Type | T-12 | T-120 | UL-28 | Ex 3 | Ex 4 | Ex 5 |
| Level | .13 | .13 | .11 | .25 | .26 | .30 |
| Mondur PF | 57.8 | 57.8 | 57.8 | 57.8 | 57.8 | 57.8 |
| 4" 325° F. Sag | 0.754 | 0.506 | 0.529 | 0.394 | 0.441 | 0.489 |

The hydroxyl-containing diorganotin catalysts, being isocyanate-reactive, become part of the polymer matrix and are therefore not sufficiently mobile to promote thermal degradation of urethane-containing elastomers. Surprisingly, these compounds are still able to provide enough catalytic activity to permit the molding of RIM elastomers.

STATEMENT OF INDUSTRIAL APPLICATION

The present invention provides polyether polyol RIM elastomers made using hydroxyl-containing organotin catalysts.

We claim:

1. A reaction injection molded elastomer made by reacting in a closed mold a composition comprising polyether polyols greater than 500 average molecular weight, an amine terminated chain extender, an aromatic polyisocyanate and an organotin catalyst of the following general formula

$$R_2Sn\{O_2C(Y)_nCO_2-Z-OH\}_2$$

where
R is a $C_1$-$C_8$ alkyl group or an aryl group;
Y is a $C_1$-$C_9$ divalent hydrocarbyl group;
Z is a divalent organic linking group; and
n is 0 or 1.

2. The elastomer of claim 1 in which R is butyl or octyl.

3. The elastomer of claim 1 in which Y is an alkylene group.

4. The elastomer of claim 3 in which Z is a divalent mono- or poly(alkyleneoxy) group.

5. The elastomer of claim 3 in which Z is a divalent bis{mono- or poly(alkyleneoxy)} alkylamine.

6. The elastomer f claim 1 in which R is butyl and n is 1.

7. The elastomer of claim 6 in which Y is —$CH_2CH_2$—.

8. The elastomer of claim 7 in which Z is a divalent mono- or poly(alkyleneoxy) group.

9. The elastomer of claim 7 in which Z is a divalent bis{mono- or poly(alkyleneoxy)} alkylamine.

10. A reaction injection molded elastomer made by reacting in a closed mold a composition comprising polyether polyols greater than 500 average molecular weight, an amine terminated chain extender, an aromatic polysiocyanate and an organotin catalyst of the formula $$R_2Sn\{O_2C(Y)_nCO_2-Z-OH\}_2$$

where
R is butyl or octyl and
Y is a $C_1$-$C_9$ divalent hydrocarbyl group; and
Z is a divalent organic linking group.

11. The elastomer of claim 10 in which Y is $-CH_2CH_2-$.

12. The elastomer of claim 11 in which R is butyl.

13. The elastomer of claim 12 in which Z is $-\{OCH_2CH_2\}_m-$ or $-\{OCH(CH_3)CH_2\}_m-$, where m is 1-5.

14. The elastomer of claim 12 in which Z is a divalent di{mono- or poly(alkyleneoxy)} fattyamine, where the mono- or poly(alkyleneoxy) group is $-\{OCH_2CH_2\}_m-$ or $-\{OCH(CH_3)CH_2\}_m-$ and m is 1-5.

15. The elastomer of claim 12 in which Z is $-\{OCH_2CH_2\}_3-$.

16. The elastomer of claim 12 in which Z is $-(CH_2CH_2)N(tallow)(CH_2CH_2)-$.

17. In the method for reacting polyether polyols, an amine terminated chain extender, and an aromatic polyisocyanate in the presence of an organotin catalyst, the improvement which comprises as the organotin catalyst a compound of the formula $$R_2Sn\{O_2C(Y)_nCO_2-Z-OH\}_2$$

where
R is a $C_1$-$C_8$ alkyl group or an aryl group;
Y is a $C_1$-$C_9$ divalent hydrocarbyl group;
Z is a divalent organic linking group; and
n is 0 or 1.

18. The method of claim 17 in which
R is butyl or octyl,
Y is $-CH_2CH_2-$, and
Z is $-\{OCH_2CH_2\}_m-$, where m is 1-5.

19. The method of claim 17 in which
R is butyl or octyl,
Y is $-CH_2CH_2-$, and
Z is a divalent di{mono- or poly(alkyleneoxy)} fattyamine, where the mono- or poly(alkyleneoxy) group is $-\{OCH_2CH_2\}_m-$ or $-\{OCH(CH_3)CH_2\}_m-$ 20. The method of claim 17 in which
R is butyl or octyl,
Y is $-CH_2CH_2-$, and
Z is $-(CH_2CH_2)N(tallow)(CH_2CH_2)-$.

* * * * *